Figure 1:
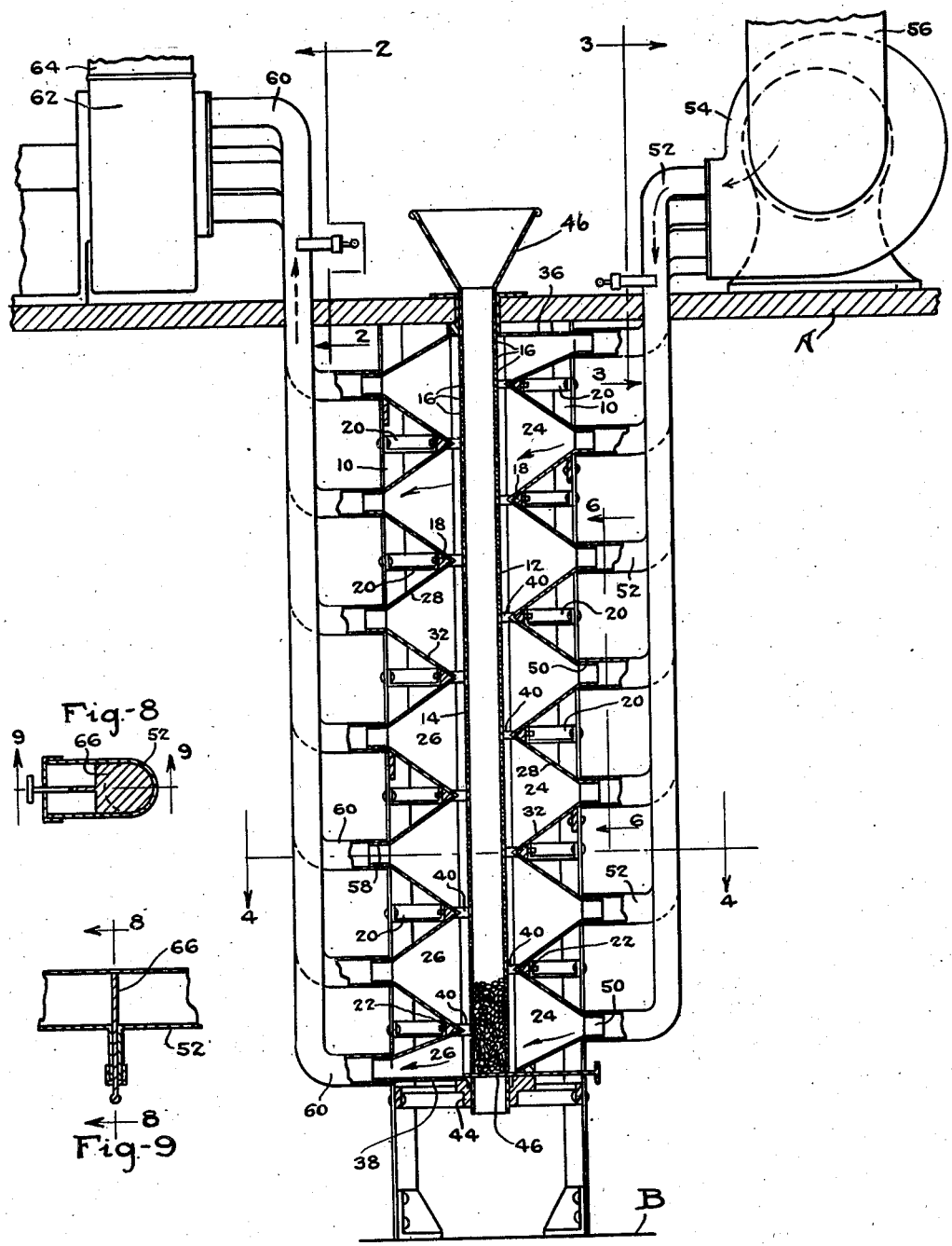

June 23, 1936.    L. K. WATROUS    2,045,319
APPARATUS AND PROCESS FOR COOLING ROASTED COFFEE,
ALMONDS, COCOA BEANS, PEANUTS, ETC
Filed Aug. 6, 1931    2 Sheets-Sheet 1

Inventor:
L. K. Watrous.
By Whiteley and Ruckman
Attorneys.

June 23, 1936. L. K. WATROUS 2,045,319
APPARATUS AND PROCESS FOR COOLING ROASTED COFFEE,
ALMONDS, COCOA BEANS, PEANUTS, ETC
Filed Aug. 6, 1931 2 Sheets-Sheet 2
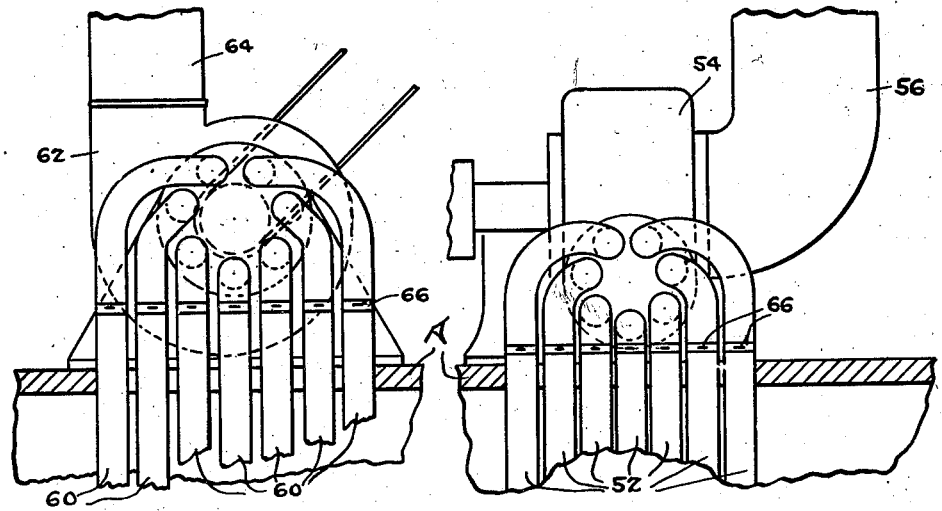
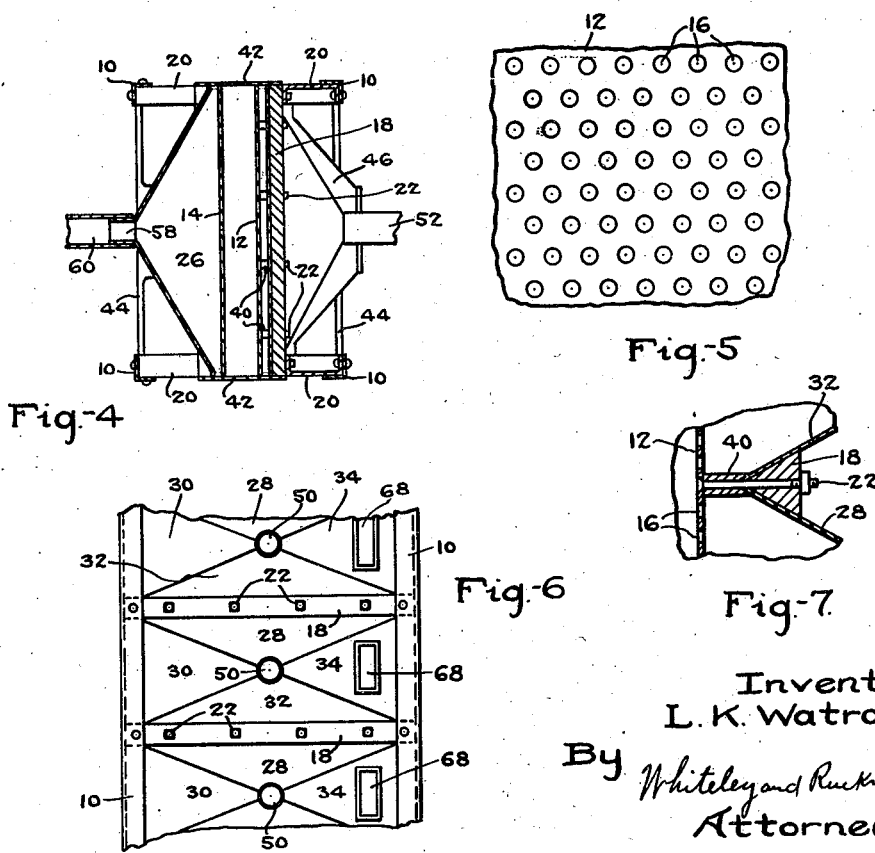
Inventor.
L. K. Watrous.
By Whiteley and Ruckman
Attorneys.

Patented June 23, 1936

2,045,319

UNITED STATES PATENT OFFICE 2,045,319

APPARATUS AND PROCESS FOR COOLING ROASTED COFFEE, ALMONDS, COCOA BEANS, PEANUTS, ETC.

Lawrence K. Watrous, Shafer, Minn.

Application August 6, 1931, Serial No. 555,431

5 Claims. (Cl. 34—34)

My invention relates to apparatus and process for cooling roasted coffee, almonds, cocoa beans, peanuts, etc. An object of the invention in general is to provide for cooling such roasted material in a manner which will be effective to maintain the freshness and proper flavor of the material for long periods of time.

The proper cooling of roasted materials such as mentioned above is actually more important than proper roasting, since these materials when properly roasted and improperly cooled are greatly damaged in flavor and keeping qualities by reason of the improper cooling. In other words, the matter of time consumed and mass of material as it is now cooled, has a most important bearing and relation to not only proper flavor development but also in regard to the preservation of the material's natural rich flavor developed by reason of the roasting process, as well as a very important relation and bearing in the evolution and conservation of the natural preserving carbon dioxid gas within the beans, nuts, etc., produced by reason of the roasting process; likewise concerning the amount of and protection of oils and fats, volatile and otherwise, in such materials which are known to hold the flavor within the minute cells of the roasted material.

Where the process of cooling is slow and uneven and also where the mass of material to be cooled is too deep in the cooling car or device used for cooling, the intense heat left in the material when dumped from the roasting machine actually continues the roasting process during the first half or three-quarters of the time of cooling under present methods of cooling. This not only ruptures the flavor-holding cells but brings the flavor-holding oils and fats and volatile content of the same up to and near the surface of the beans, nuts, cocoa, etc., and so causes a marked loss of flavor and a more rapid deterioration in the finished product as well as a harmful loss of carbon dioxid gas, since all forms of present cooling devices which involve mass cooling allow the exhaust heat as it is withdrawn, to continually pass over and through other beans, etc., thereby causing a very damaging over-heating of the material in the lower part of the mass. This causes a further change in color of the roasted material, thereby losing the proper color desired in the cooled material, which should be maintained according to the color when the roast was withdrawn from the roasting machine, and which in a way provides an undesirable double-roast or an effect just as harmful to flavor and keeping qualities as a double-roast.

The above mentioned defect in present coolers not only makes it necessary to strike the roast lighter than it should be in the final product in order to offset the additional color it receives from continued slow roasting in present cooling devices, but such anticipation of proper color actually prevents perfect flavor development in the roasting machine where the original heat application best develops not only proper and true flavor but the maximum of preserving gas within the flavor-holding cells without rupture, which rupture takes place in present type cooling machines or cars to the detriment of the flavor and keeping qualities, owing to the deep mass of beans, cocoa, nuts, etc., which machines have the fault of drawing the heat from the top of the mass down through the bottom of the cooler in order to accomplish cooling and thus cause the effect of color change, double-roasting and cell rupture, as above mentioned.

My cooling device and process is designed to do away with mass cooling of all forms by immediately placing the hot roasted materials in a comparatively thin wall or sheet between screens so that when chilled air is applied from one side of the cooling device and removed by suction from the opposite side, the heat remaining within this thin wall or sheet of material between the screens is far more quickly removed without undue penetration and over-heating of the material to be cooled, thus avoiding the fault of overheating and double-roasting that now takes place in all forms of mass cooling in present devices or cooling cars. With these present devices, the mass of material lies deep upon itself or is agitated and turned in cylinders in such quantities that the intense heat left within the roasted material when removed from the roaster continually passes through other parts of the mass of material and so not only continues further roasting and change of color but this heat further ruptures the oil and fat cells which hold flavor material and carbon dioxid gas, and by reason of this rupture permits an escape of the valuable flavor material, oil, fats, and gas to find lodgment at or near the surface of the beans or nuts, thereby resulting in rapid deterioration. This rupture also permits the actual loss of carbon dioxid gas from the cells, where it should be kept in unruptured cells to properly preserve the fats, oils, flavor, etc.

By reducing the roasted material to a thin sheet or wall as is done in my new cooling device before applying the chilled air and the suction at the opposite sides of the cooler, the depth and placement of material to be cooled is such that heat removal is accomplished so quickly that heat does not penetrate other parts of this sheet, wall or upright layer of coffee, cocoa, nuts, etc., but by reason of the thin sheet of material to be cooled, this stored up heat is withdrawn much more advantageously around the outside of the individual beans, nuts, cocoa, etc. that compose the material to be cooled instead of passing through them as is the case in present mass coolers and methods of cooling. My method furthermore has a tendency to seal the outside surface of the material and thus protect the flavor within from the usual loss, surface exposure, and rapid deterioration; also the quick cooling prevents the rupture of the oil or fat flavor-holding cells which rupture now happens from excessive heat in present coolers and method of cooling. The prevention of cell rupture as mentioned above results in holding within the cells of the coffee beans, nuts, etc., the important content of carbon dioxid gas which acts as a preservative and thus prolongs the active term of flavor and freshness in all coffees, etc., cooled in my device but which are usually harmed or lost by heat rupture of cells from expansion in other devices now designed for cooling the materials mentioned above after roasting.

It is a fact that laboratory tests have shown that roasted materials such as previously referred to, when cooled in my device, actually maintain freshness of roasting flavor four or five times longer than the same materials when cooled in "mass" as is now necessary in present devices. Further laboratory tests have proved also that my cooling device provides within coffee beans, cocoa, nuts, etc. a greater amount of preserving gas (carbon dioxid) of greater action and duration than is provided by other cooling devices; also that the extractable volume of free valueless oil or fat is desirably less than that produced in the same material when cooled in present day cooling devices, which in turn not only proves non-rupture of flavor holding cells but that an excess creation of material into fat or oil within the beans, etc., not only injures flavor but likewise hastens all forms of usual flavor deterioration, whereas my cooling device actually provides a far better keeping quality with a greatly delayed deterioration, making a product which when cooled in my device is far more pleasing to the taste and very much less apt to produce bad after effects.

Actual tests of cooling with various forms of my device have proved that proper cooling should be controlled in regard to time just as much as proper roasting must be timed for the best results of flavor development. Tests also prove that temperatures vary too greatly in different seasons and from day to day, so that "time cooling" must be controlled by type and volume of air used on the air supply side of my device and its immediate withdrawal on the exhaust side of the same device; also that in order to properly cool roasted materials from day to day, winter and summer, chilled air of the same definite temperature must be used which is highly important to obtain the best flavor preservation. My device for cooling is therefore connected to an air-chilling chamber so that the air supply side of my cooling device receives properly chilled air of low temperature which is most essential to provide the fast speed of cooling especially in and during the warm seasons of the year, a time of the year which without my cooling device, takes much longer to cool all roasted materials than in winter time on account of the warm air sucked into the mass of coffee, etc., as in present coolers but which defect is definitely eliminated in my new cooling device which controls the length of time and temperature of air used for cooling purposes. Furthermore, air pumps or fans connected to the air supply side of my cooling device and air pumps connected to the exhaust or suction side of my device are so arranged that speed, volume and time of cooling are regulated and properly controlled by means of controls placed at the side of the roasting machines whereas the cooler is preferably located on the floor below the roaster; also other controls in the same location permit regulation of cooling for various sized roasts by reason of shut-off controls effecting various supply and exhaust slides of the cooling device depending on the height of roasted material discharged into my cooling device for the purpose of being cooled.

Chilled air of proper low temperature for my cooling device is preferably drawn by pipes from chilled air chambers located in the lower part of the building, these chambers being provided with means of refrigeration. However in very cold weather, the chilled air can be drawn from outside the building providing it is dry not damp air, thus reducing cost of operation during the winter time when near freezing or below freezing temperatures prevail.

A further advantage of my cooling device for roasted materials relates to the fact that it permits making a very dark or high roast without the attendant fault of fat or oil coming to the surface in a so-called "sweat" during and after cooling which it now does with present types of coolers or so-called cooling devices and cars. My device permits a more perfect development and control where high or dark roasts are concerned, without this fault of oil sweating which not only spoils the style of roast but also provides the means of a very rapid flavor deterioration.

Carbon dioxid gas is evolved in coffee beans, nuts, etc. by the action of the roasting process and tends to prevent oxidation of fats or oils in the roasted materials and it is very important to maintain this carbon dioxid as long as possible within the inner cells of the coffee beans, nuts, etc, and thus prevent such oils or fats from becoming rancid and developing a stale odor and taste. Properly controlled "time cooling" as accomplished by my cooling device for roasted materials maintains the high efficiency of this gas within the cells of these roasted food products and thus longer preserves their certain types of oils or fats and flavor from the too rapid deterioration that now takes place when these roasted materials are cooled in present devices which have the fault of permitting excess exposure to intense and prolonged heat, thus rupturing the oil or fat, flavor and carbon dioxid holding cells by expansion of such materials within the minute cells, thus permitting an escape of the desirable carbon dioxid gas, etc. toward the surface. This is an action that does not take place when these roasted materials are cooled almost instantly in my device due to the very thin wall or sheet of roasted material as arranged for proper cooling by means of gravity flow, then subjected to immediate change of temperature by continuous pressure of chilled air quickly applied at one side of the retaining screen and sucked through the thin wall or sheet of roasted material from the other side of the retaining screen, thus forcing the excess heat around the surface of the coffee beans, nuts, etc., instead of slowly through such material which latter is deleterious to quality and freshness, as well as keeping qualities, a fault that should be avoided since continued heat penetration of the cooling roasted materials causes cell rupture as previously mentioned with its attendant harm, and further, cooks out not only an important part of the fine flavor of the material but also cooks out the desired and necessary carbon dioxid gas which must be maintained within the cells to properly preserve fine freshness and rich flavor.

The fact that green coffee shows practically no free carbon dioxid gas and that this gas is lost less quickly when the roasted beans, nuts, etc., are not broken, crushed or ground, and the further fact that an immediate loss to almost zero takes place as soon as broken, crushed or ground, prove the great desirability of my new cooling device and process since I thereby maintain within the cooled material a greater evolution of the carbon dioxid gas in cells for preserving purposes even when broken, crushed or ground, due to an inside sealing of these minute cells with a natural gum or waxy substance by quick chilling in cooling; furthermore due to the creation of a smaller amount of extractable free fats or oils which involves a chemical action, my chilled air cooling device maintains while all other present cooling devices fail to maintain unbroken these thousands of minute cells but instead rupture them by continued delayed and penetrating heat, thus releasing the flavor-holding oils or fats, volatile oils, and the valuable carbon dioxid gas. My new cooling device quickly chills the oils or fats and gas within these cells and stops the expansion thereof before rupture of cell-walls takes place by reducing the expanded volume or pressure and thereby permitting the inside sealing of the cell walls by reason of the gumlike or waxy substance evolved within the cells which hardens with my rapid or chilled cooling in all roasted materials which I have in mind. The action of my cooling device upon the outside surface of coffee beans, nuts, etc. also tends to chill a lighter but similar gum or waxy coating or covering which delays the penetration of oxygen and moisture which are well known and very active agencies of deterioration in roasted materials as above mentioned. My cooler delays such penetration to a far greater extent than other cooling devices now used with their attendant heat-rupturing of these holding cells since in present day coolers, the mass of roasted material placed therein for cooling involves from five to ten inches in thickness of roasted hot coffee, cocoa, nuts, etc. and the cooling air is drawn down through this mass from the surface, gathering blistering heat on the way, and thus superheating the material lower down, whereas my cooling device reduces the thickness of material to two inches or not over three inches at the most having an upright position, the number of inches of thickness depending on whether coffee, cocoa, nuts, etc., are being cooled, and upon the individual size of the beans, nuts, etc. In my device, there is no super-heating from uncontrolled uneven slow cooling of a thick mass deep upon itself.

A continued high temperature after roasting as in cooling with various present cooling devices, affects fats and oils of high molecular weight which undergo "cracking" or breaking up into simpler fractions, some of which revert to oils or fats, eventually producing oils of definite relation in odor and taste to castor oil, and which provide the disagreeable smell and taste in stale coffee, etc., an action and result that should not happen in roasted materials and which is not noticeable in aged roasted coffee, cocoa, nuts, etc., when quickly and properly cooled as in my new cooling device.

With the present methods of slow cooling, all roasted materials undergo a change after cooling by which they become stale in odor and taste and oftentimes rancid. This is largely due to excessive prolonged heat in present coolers which changes fatty and oily substances by oxidation into simpler fatty acids which are unsaturated and these gradually take up oxygen with the above undesirable results from the standpoint of quality. With my quick cooling device, such undesirable action is withheld to such an extent that roasted materials even after a year still lack that very undesirable flavor which these materials have when cooled in all other cooling devices within a short time after slow cooling.

The full objects and advantages of my invention will appear in connection with the detailed description thereof, and the novel features of my inventive idea will be particularly pointed out in the claims.

Referring to the accompanying drawings which illustrate one of the forms of apparatus in which my invention may be embodied,—

Fig. 1 is a view of the device mostly in vertical section and with a portion shown in elevation. Fig. 2 (sheet 2) is a view in section on the line 2—2 of Fig. 1. Fig. 3 is a view in section on the line 3—3 of Fig. 1. Fig. 4 is a view in section on the line 4—4 of Fig. 1. Fig. 5 is a fragmentary face view of the screen. Fig. 6 is a view in section on the line 6—6 of Fig. 1. Fig. 7 is a fragmentary sectional view of securing means. Fig. 8 (sheet 1) is a view of a control slide in section on the line 8—8 of Fig. 9. Fig. 9 is a view of the slide in section on the line 9—9 of Fig. 8.

Referring to the construction shown in the drawings, the letter A designates the floor upon which a roasting machine is supported while the letter B designates a lower floor which may be a basement floor. As will be understood from Figs. 1, 4 and 6, four angular corner posts 10 extend between the floors A and B, being secured thereto in any suitable manner. Two perforated plates 12 and 14 extend vertically in the space within the posts 10, these plates being set inwardly from the sides of this space so as to be spaced from each other about two to two and one-half inches when roasted coffee is intended to be placed between the plates for cooling. For other roasted material which is to be cooled between the plates, the space between them may be made a little less or more as found desirable. The perforated plates 12 and 14 are commonly designated screens, and for use in cooling coffee, I prefer to provide twenty of the perforations 16 per square inch as shown in Fig. 5, the perforations in this case being one-eighth of an inch in diameter. The perforations, of course, may be varied both as to number and size according to the material which is to be cooled. A number of horizontal bars 18 triangular in cross-section are placed outside the screens 12 and 14 in spaced relation thereto and with the bars which are adjacent one screen arranged in staggered relation to the bars which are adjacent the other screen. The bars 18 at their ends are secured to angular frame members 20 which in turn are secured to the corner posts 10. The screens 12 and 14 are secured to the bars 18 by bolts 22 whose heads are flush with the inner surface of the screen as shown in Fig. 7. Cold air chambers 24 are provided adjacent the screen 12 while exhaust air chambers 26 are provided adjacent the screen 14. Each of the chambers 24 and 26 in general is formed by four walls 28, 30, 32 and 34 which fit together in the form of a pyramid with the base thereof adjacent the screen. The exception to this general rule of construction is that as shown in Fig. 1, the upper right hand chamber is formed with an upper flat wall 36 while the lower left hand chamber is formed with a lower flat wall 38. These two smaller chambers are the result of the staggered arrangement of chambers whereby those on one side of the screen structure are positioned in offset relation to those on the other side. While seven of the chambers are shown on each side of the screen structure for illustrative purposes, it is to be understood that the number may be varied as desired and according to conditions which are to be provided for. In order to secure the wall structure in place, I have shown one practical method in which the wall members 28 and 32 are integrally connected at their bases at an angle constructed to nicely fit upon the angular bars 18 where they face the screens. The bolts 22 previously referred to, pass through the apices of the angles with spacing sleeves 40 surrounding the bolts and interposed between the screens and the angles of the wall members, these sleeves at their outer ends being notched to fit upon the angles as will be understood from Fig. 7. It is to be understood that the lateral extent of the chambers 24 and 26 may be of any desired dimension and is co-extensive with the width of the screens 12 and 14 so that all of the roasted material between the screens will be subjected to proper chilling action. The space between the sides of the screens is closed by imperforate plates 42. The screen structure at its lower end stops short of the floor and is held in a support 44 connected with the corner posts. Immediately at the bottom of the two lowermost chambers 24 and 26, the screen structure is provided with a slide 46 which is withdrawn as soon as the roasted material has been properly cooled so that this material discharges by gravity from the screen structure and is taken care of in any suitable manner. The upper end of the screen structure extends through the floor A and is provided with a funnel 48 slipped thereover and by means of which the roasted material is guided into the space between the screens. The centers of the wall structures forming the chambers 24 are provided with outwardly extending tubular members 50 to which are fitted pipes 52 leading from a blower fan or pump 54 which has a tubular connection 56 with any suitable source of chilled air. The centers of the wall structures forming the chambers 26 are provided with outwardly extending tubular members 58 to which are fitted pipes 60 leading to a suction fan or pump 62 having a discharge pipe 64. The pipes 52 and 60 are provided with slides 66 best shown in Figs. 8 and 9 whereby the blast of chilled air through the chambers 24 and the suction from the chambers 26 may be regulated and controlled as may be found desirable. One of the wall members of each of the chambers 24 and 26 is preferably provided with a removable peep window 68 for the purpose of watching for or locating burning coffee, etc., and also through which the inside of the screen may be cleaned or freed from broken coffee chips, etc., especially on the suction side.

The operation and advantages of my invention have to a large extent already been indicated. As soon as the roasted material is removed from the roasting machine, it is immediately poured through the funnel 48 into the space between the screens 12 and 14, the slide 46 at the bottom thereof being closed at this time. The result of this is to place the material immediately after the roasting thereof in comparatively thin sheetlike form. This sheet is very quickly chilled by the cold air driven by the blower into the chambers 24 and distributed by the latter through the screen 12 into the space occupied by the roasted material. The suction device 62 sucks air through the opposite screen 14 so that the sheet of roasted material is subjected to an extremely rapid cooling action. As previously intimated, the temperature of the air delivered by the blower 54 is preferably down to near the freezing point. The staggered arrangement of the chambers 24 and 26 causes the chilled air to be more uniformly distributed through the sheet of roasted material. The provision of slides such as 66 enables the operator to control and regulate the blast of chilled air and the suction in such manner as to produce the best results. As soon as the roasted material has been placed in the screen structure, the funnel 48 may be removed and replaced by a locking cap flush with the floor A. This will prevent escape of chilled air pressure and glowing of roasted material up into the roasting room in case the operator fails to keep the suction equal to the pressure of the chilled air, and will also prevent sucking down of warm air into the screen structure from the roasting room in case the suction is allowed to become greater than the pressure of the chilled air.

I claim:

1. The process of cooling roasted coffee, almonds, cocoa beans, peanuts, etc., which consists in placing the material immediately after the roasting thereof in the form of a comparatively thin sheet, and subjecting said sheet to the action of air chilled to a low temperature.

2. The process of cooling roasted coffee, almonds, cocoa beans, peanuts, etc., which consists in placing the material immediately after the roasting thereof in the form of a comparatively thin sheet, forcing air chilled to a low temperature through said sheet from one side thereof, and applying suction to the opposite side of said sheet.

3. The process of cooling roasted coffee, almonds, cocoa beans, peanuts, etc., which consists in placing the material immediately after the roasting thereof in comparatively thin sheetlike form, forcing air chilled to a low temperature through said sheet at successive places along one side thereof, and applying suction to the opposite side of said sheet at successive places which are offset with relation to said first mentioned places.

4. Apparatus for cooling roasted coffee, almonds, cocoa beans, peanuts, etc., comprising a screen structure for receiving and confining the roasted material in the form of a comparatively thin sheet as it comes from the roaster, a plurality of chambers extending along one side of said screen structure and connected to a supply of chilled air, a blower for positively forcing a rapid current of air from said supply of chilled air through said chambers and through said sheet, a plurality of chambers extending along the other side of said screen structure in staggered relation to said first-mentioned chambers, and means for applying suction to said second-mentioned chambers.

5. Apparatus for cooling roasted coffee, almonds, cocoa beans, peanuts, etc., comprising a vertically disposed screen structure for holding the roasted material in the form of a comparatively thin sheet, a movable closure for the lower end of said screen structure, a plurality of chambers extending along one side of said screen structure, a blower for driving air chilled to a low temperature into said chambers and through said sheet from one side thereof, a plurality of chambers extending along the other side of said sheet in staggered relation to said first mentioned chambers, and means for applying suction to said last mentioned chambers.

LAWRENCE K. WATROUS.